Patented Jan. 26, 1932

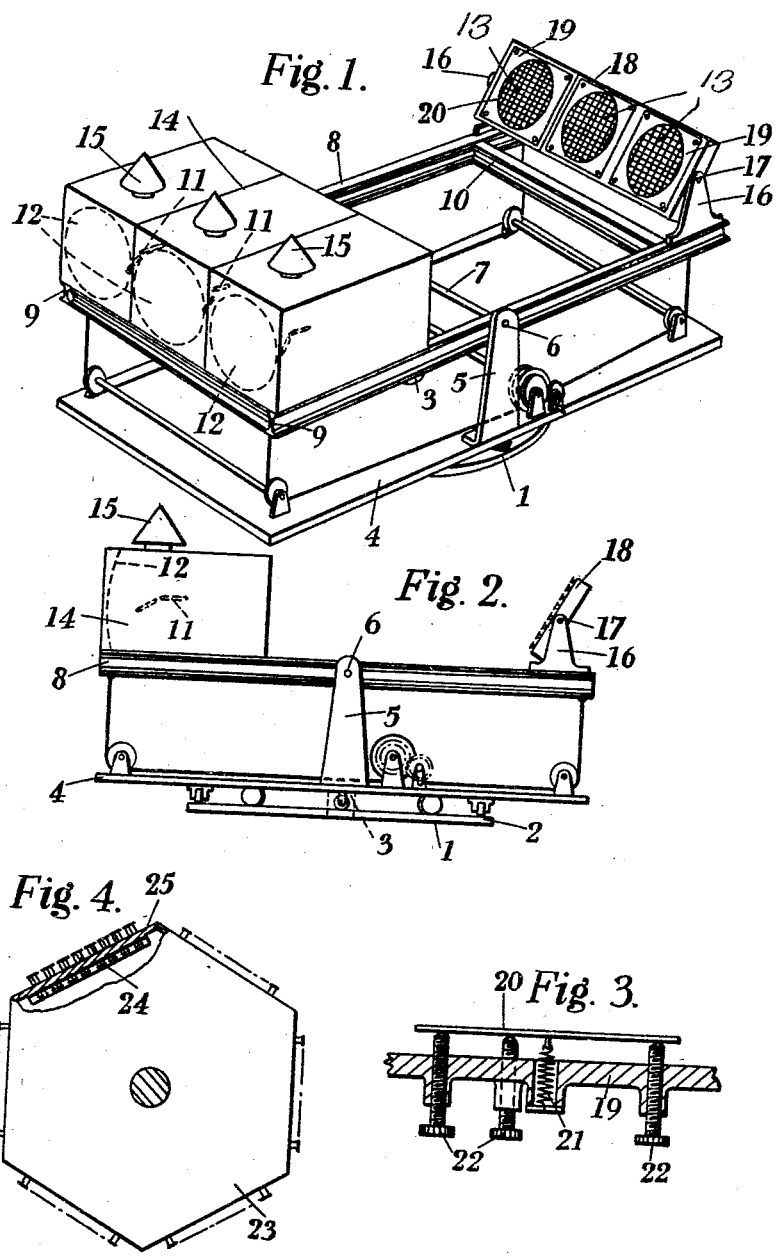

1,842,840

UNITED STATES PATENT OFFICE

CYRIL ERNEST RANDALL, OF LONDON, AND LEONARD ROBERT THOMPSON, OF HENDON, LONDON, ENGLAND, ASSIGNORS TO JOHN CLIFFORD SAVAGE, OF LONDON, ENGLAND

PROJECTION APPARATUS

Application filed September 28, 1929, Serial No. 395,970, and in Great Britain October 3, 1928.

This invention comprises improvements in and connected with methods of and means for projecting light and other radiations and is concerned with a class of projection apparatus in which the rays from a high intensity source are received by a projection mirror or reflector and reflected on to a mosaic of mirrors each of which is appropriately angularly adjusted or adjustable for diverting a portion of said beam in a given direction. Thus the mirrors may be adjusted for projection on to the screen of spots of light disposed along lines forming characters and in this way advertisements and signs may be projected on to clouds and other distant screens.

Methods and apparatus for the projection of luminous signs on to distant screens of the character aforesaid have formed the subject of Patent No. 1,750,785 and of copending application Serial No. 365,505. Known forms of apparatus have however suffered limitations, particularly in regard to the amount of light available for distant projection, the light having been obtained from one arc light or, at the most, two. Furthermore, limitations of an important character were imposed by difficulties connected with the projection reflectors which are neither practical nor economical beyond a certain restricted diameter.

Attempts to increase the brilliance of the luminous image have moved in the direction of employing a larger source of light and a proportionately longer focus projection mirror, the idea being to project an image of the arc of the same size as before but of increased brightness. Apparatus constructed for this purpose becomes unwieldy for the projection mirror and the mirrors of the mosaic must be of greater dimensions and projection mirrors of the diameter required are not readily obtainable commercially.

Furthermore the method previously proposed for altering the elevation of the beams reflected by the mosaic where a mosaic of plane mirrors is so arranged as to maintain its angle of inclination relative to the axis of the projection mirror and light source but is rotatable so that the deflection of the rays may take place in a substantially vertical plane, or may be swung down to a horizontal plane, or intermediately, thus giving a variable inclination of the luminous image on the screen, has a defect in that one cannot guarantee that every unit portion of the projection mirror regarded as a series of rings from successive parts of which any mirror in the mosaic picks up its illumination during the translation from a vertical to horizontal throw, is in itself regular and thus the delicate and exact coadjustment of projection mirror and mosaic is liable to be thrown out by the necessary action of altering the angle of elevation of the display.

In addition the rotatable mirror mosaic is, owing to its large size and difficult mechanical contruction, a particularly heavy piece of mechanism and cannot readily be exchanged for another mirror mosaic to change the form of the sign or other image projected.

Any attempt to increase the brilliancy of the luminous image by enlarging the crater of the arc and using a longer focus projection mirror produces an aggravation of this defect of weight and leads to an impracticable design and enhanced cost of construction.

According to a feature of this invention, two or more sources of light or other radiations are employed, each in conjunction with its own projection reflector and with its own respective mirror assemblage or mosaic adapted for receiving rays reflected by the projection mirror or reflector and all the mirror assemblages are adjusted in a similar manner so that at a predetermined distance from the apparatus the radiations projected by corresponding mirrors of each assemblage melt whereby in the case of light rays a luminous sign of greatly increased brilliance is produced upon a screen located at the point of coincidence. In the case of the formation of a luminous image on a distant screen such projection mirror or reflector may be a searchlight reflector of the spherical or parabolic type, and the mosaics may be composed of plane concave or convex mirrors arranged near to the respective source and projection mirror or reflector and across the path of the reflected rays which are completely intercepted by the mosaic. Any one mirror of any one of the mosaics will project on to the distant screen an image of the source of light and thus produce a luminous spot of maximum intensity and definition, and as every one of such mirrors is capable of separate angular adjustment, it is possible to dispose the projected spots of light along the lines of signs characters and so on. Thus, a display of letters of light on clouds and other distant screens may be of increased brilliance and sharply defined owing to the conjoint effect of several sources of illumination each being employed in combination with pieces of apparatus which are of handy size and easily mounted and manoeuvred. The improved effect, also, is due to the fact that better optical effects can be obtained and less expensive optical elements used when the light projection means are split up into co-operative units instead of being embodied in one single large unit.

It is important in the apparatus of the present invention that there be a rigid co-adjustment of the three optical components of a unit, namely the source of light or other radiations, the projection mirror or reflector and the assemblages of mirrors during projection, and also a rigid relative adjustment of the units themselves, for the setting given to the numerous mirrors of such assemblages must not be disturbed during adjustments for altering the elevation of the projection. In other words, although two, three, four or any convenient number of sources of radiations may be arranged each with its projection mirror to produce separate beams of light or other radiations they are all rigidly fixed to a common frame and the resultant beams fall upon mirror mosaics which are all on one frame and which can be set up and operated in exactly the same way as if they were one patch of mirror mosaic opposite to one lamp and one reflector.

In addition, the present invention provides a simple and convenient way of substituting one set of mosaics or assemblages for another so as to permit in the case of the formation of a luminous sign on a screen of the form of the luminous outline being readily varied. The whole construction is compact, and in proportion to its power, relatively light and portable.

In order that the present invention may be clearly understood and readily carried into effect reference may now be had to the accompanying drawings diagrammatically illustrating one embodiment of the invention and in which:—

Figure 1 is a perspective view of the principal parts of an apparatus according to the invention;

Figure 2 is a side elevation view of the apparatus shown in Figure 1;

Figure 3 illustrates a mode of mounting each mirror of the mirror mosaics;

Figure 4 illustrates one mode of bringing on one of a number of differently set up sets of mirror mosaics into the path of the beams of light.

As shown the apparatus comprises a base or foundation 1 upon which is provided a circular track 2 with a central pivot or centering device 3 and turntable 4 mounted on the track 2 and centering device 3. The turntable 4 is fitted with rigid standards 5 for supporting bearings 6 for an axle or trunnions 7 of a rocking chassis or frame 8 carrying the whole of the optical devices. The chassis 8 is of very rigid construction and is rockable by suitable means, preferably so that a variation from the horizontal of 30° in each direction may be obtained with accuracy. Thus, the chassis 8 may be suitably counterweighted if necessary and may be operated in any convenient manner either manually or automatically such for instance as through a combination of cables, pulleys and screw gear for securing the desired adjustment. Where cables are used it is advantageous to anchor them at each end of the frame or chassis 8 and to impart the pull by means of screw gear operating through the medium of equalizing pulleys. In this way the two sides of the chassis 8 are operated upon equally and there is no tendency to cant.

The principal constructional features of the chassis are two main girders 9 of exceptional strength and rigidity, having regard to the nature of the structure, and tension and compression members 10 arranged transversely for bracing the main girders 9 and producing a rigid frame. One half of the frame 8 is on one side of the rocker bearing and serves for supporting the light sources 11 and projection reflectors 12, the other half on the opposite side of such bearing serves for supporting the assemblages or mosaics of mirrors 13. In the drawings three light sources and their projection reflectors are shown and these are all mounted rigidly so that their optical axes are in accurate parallelism. Thus, they may all be mounted in a rigid metal framework forming part of a lamp house 14 fitted with appropriate chimneys or vents 15 and bolted down on the rockable chassis. At the opposite end of the frame on the opposite side of the rocker bearing, there are erected two standards 16 fitted with half bearings not shown and made rigid for instance by means of struts and bracings. These half bearings receive the trunnions or axles 17 of a framework 18 designed for supporting panels or frames 19 on which are mounted the numerous adjustable mirrors 20 forming the three assemblages or mosaics for co-operation with the three optical units. The panels 19 may be removably mounted on the framework so that they can be interchanged with facility. Also, sets of panels may be mounted on opposite sides of such framework, so that by swinging the latter through 180° around its axles or trunnions, a different set of mirror assemblages or mosaics may be presented towards the projectors. Preferably the mirror frame is set at an angle with the axis of the projection mirrors to throw the display back towards and over the lamp house at a mean angle of about 60 degrees. This involves sloping the whole mirror panel board at an angle which may be conveniently about 30 degrees with the vertical bearing standard, that is to say, at an angle of 60 degrees with the main girders.

Each mirror panel 19 may consist of a shallow tray constructed in one piece adapted to be bolted on the front or back of the frame and carrying front and facing sheets of suitable material which may be thick ply wood or any material that is light and rigid in the form of sheets. The areas on which the rays from the lamps and mirrors fall are covered with plane reflecting mirrors 20 of suitable size and each mounted so that they may be adjusted accurately by tipping to produce the necessary deflections of the image bearing rays from the lamp house and thus synthetize the sign or device required on the screen. One manner of mounting the individual mirrors 20 of the mirror mosaics is illustrated in Figure 3 in which the mirror 20 is shown as held to the panel 19 by its centre point by the spring 21 and as acted upon by three screw elements 22 cooperating with suitable bosses on the panel.

An obvious variation of the reversible frame is the provision of a 3, 4, 5 or 6 sided drum mounted to turn in the same way, each side of the drum fitted with a full complement of mirror mosaic panels suitably secured and having its mirrors adjusted for the production of a given sign or display. In Figure 4 a hexagonal frame 23 is shown on each face of which the appropriate number of mirror mosaics is adapted to be detachably secured. To accommodate the panels the faces of the frame may be recessed at 24 and the panels may be detachably secured in any convenient manner on the shoulders 25. The hexagonal frame is of course adapted for rotation in such a manner as to bring any one of its faces into cooperative relation with the beams of light.

The projection reflectors or mirrors to be employed are preferably good quality searchlight reflectors which should be of such a diameter and focal length as to produce a sign of the dimensions required.

These reflectors should have an angle of interception for the light from a source placed at the foci of not less than 90°. The reflectors may conveniently be removably mounted in their housings so that they may be quickly and easily removed for cleaning to prevent the serious inefficiency occasioned by the deposit on the glass of fumes from the lamps.

The light sources may be of the standard type used in searchlights, with the carbon carriers made in such a way that very little obscuration of the rays returning from the projection reflector or mirror is produced. They can be conveniently burned in series or parallel and should be adapted to use "high intensity chemically cored carbons" at high current density to produce the utmost brilliancy in the craters. The light sources are most advantageously of the type adapted to burn steadily with a rather long arc.

Current for the light source may be fed in through the centering device and turntable bearing from slip rings mounted beneath the foundation or from copper on the foundation on which track brushes or slippers on the turntable make contact.

The controls of all the light sources may be brought out together at one side of the lamp house so that they may be operated conveniently by one attendant.

All the mechanical movements of the projector i. e. rotation—elevation and the changing of displays by the reversal of the mirror mosaic frame may if desired be distantly controlled by relays and electric or other suitable drives attached at suitable points so that an observer remotely situated who is usually better able to judge the best direction in which to project, may directly control the training of the apparatus.

When an apparatus as heretofore described is used for the projection of a luminous sign on to a distant screen the individual mirrors 20 of the mirror assemblages 13 are angularly adjusted with respect to one another in such wise that the several assemblages project the same sign upon a common area on the distant screen thereby intensifying the luminosity thereof.

We claim:

1. Apparatus for projecting light and other radiations comprising the combination of a plurality of devices disposed for producing a number of substantially parallel beams of radiations proceeding in the same direction and parallel to one another, a plurality of assemblages of optical units each disposed to occupy a cross sectional area of one of said beams and means whereby selected pencils of rays from each assemblage are all caused to converge to a common point a predetermined distance from said apparatus.

2. Apparatus for projecting light and other radiations as claimed in claim 1 in which a common rockable frame is provided for all said assemblages thereby enabling the direction of projection of the radiations from all said assemblages to be adjusted simultaneously.

3. Apparatus for projecting luminous signs on to distant screens comprising in combination a number of devices disposed for projecting substantially parallel beams of light in the same direction and parallel to one another, a number of assemblages of mirrors each disposed to occupy an inclined cross sectional area of one of said beams of light, and means whereby selected pencils of rays from each assemblage are all caused to assist in the formation of a common area of light on the screen whereby a luminous sign of increased brilliance is obtained.

4. Apparatus for projecting luminous signs on to distant screens as claimed in claim 3 in which the said assemblages are mounted upon a common tiltable frame thereby enabling the position of the luminous sign on the screen to be changed.

5. Apparatus for projecting light and other radiations comprising a chassis, means whereby said chassis may be rocked about a horizontal axis, a plurality of devices each capable of projecting a substantially parallel beam of light or other radiations mounted upon said chassis in such a manner that the axes of the several beams are substantially parallel, a plurality of assemblages of optical units mounted upon said chassis and each disposed to occupy a cross-sectional area of one of said beams and means for adjusting said assemblages simultaneously for the purpose specified.

6. Apparatus for projecting light and other radiations comprising a chassis, means whereby said chassis may be rocked about a horizontal axis, a plurality of devices each capable of producing a substantially parallel beam of light or other radiations mounted upon said chassis in such wise that the several beams proceed in the same direction and are substantially parallel to one another, a framework mounted upon said chassis in the path of said beams, and a plurality of assemblages of optical units mounted upon said framework so that each is in the path of one of said beams of light.

7. Apparatus for projecting light and other radiations comprising a chassis, means for rocking said chassis about a horizontal axis, a plurality of devices each capable of producing a substantially parallel beam of light or other radiations mounted upon said chassis in such wise that the several beams proceed in the same direction and are substantially parallel to one another, a set of assemblages of optical units mounted on said chassis so that each is in the path of one of said beams, at least one additional set of assemblages of optical units and means to enable any one of such sets of assemblages to be brought into operative relation with said beams at will.

8. Apparatus for projecting light and other radiations comprising a chassis, means for rocking said chassis about a horizontal axis, a plurality of devices each capable of producing a substantially parallel beam of light or other radiations mounted upon said chassis in such wise that said beams proceed in the same direction and are substantially parallel to one another, a framework mounted upon said chassis, assemblages of individually angularly adjustable optical units mounted on said framework so that each assemblage cooperates with one beam and means to permit angular adjustment of said chassis about a vertical axis.

9. Apparatus for projecting luminous signs on to distant screens comprising in combination a chassis, a number of devices each capable of producing a substantially parallel beam of light mounted upon said chassis, assemblages of mirrors mounted upon said chassis to occupy inclined cross sectional areas of respective beams of light, means for individually angularly adjusting the mirrors of each assemblage and means to enable said chassis to be rocked about a horizontal axis.

10. Apparatus for projecting luminous signs on to distant screens comprising in combination a chassis, a number of devices each capable of producing a substantially parallel beam of light mounted upon said chassis, assemblages of mirrors mounted upon said chassis so that each occupies an inclined cross sectional area of one of said beams of light, means for individually angularly adjusting the mirrors of each assemblage, means whereby said chassis may be adjusted angularly about a horizontal axis and means whereby said chassis may be adjusted angularly about a vertical axis.

11. Apparatus for projecting luminous signs on to distant screens comprising in combination a chassis, a number of devices each capable of producing a substantially parallel beam of light mounted upon said chassis in such wise that said beams proceed in the same direction and are substantially parallel to one another, a framework rotatable about a horizontal axis mounted upon said chassis in the path of said beams at a predetermined distance from said devices, assemblages of mirrors mounted upon said framework so that each cooperates with a corresponding beam of light, means for individual angular adjustment of the mirrors of each assemblage, means for angularly adjusting said chassis about a horizontal axis and means for angular adjustment of said chassis about a vertical axis.

12. Apparatus for projecting luminous signs on to distant screens comprising in combination a chassis, a number of devices each capable of producing a substantially parallel beam of light mounted upon said chassis in such wise that said beams proceed in the same direction and are substantially parallel to one another, a framework rotatable about a horizontal axis mounted upon said chassis in the path of said beams, a number of sets of assemblages of mirrors mounted upon said framework so that the individual assemblages of each set cooperate with a corresponding one of said beams, said sets of assemblages being brought into operative relation with said beams at the will of the operator.

In testimony whereof we have signed our names to this specification.

CYRIL ERNEST RANDALL.
LEONARD ROBERT THOMPSON.